United States Patent
Plache et al.

(10) Patent No.: US 10,545,747 B2
(45) Date of Patent: Jan. 28, 2020

(54) APPLICATION MODULE DEPLOYMENT

(71) Applicant: Rockwell Automation Technologies, Inc., Mayfield Heights, OH (US)

(72) Inventors: Kenneth S. Plache, Scottsdale, AZ (US); Michael J. Ohlsen, Chesterland, OH (US); Kevin W. Peters, Aurora, OH (US); Kyle K. Reissner, Hudson, OH (US); Ashish Anand, Mayfield Heights, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 15/706,931

(22) Filed: Sep. 18, 2017

(65) Prior Publication Data
US 2019/0087166 A1 Mar. 21, 2019

(51) Int. Cl.
G06F 8/61 (2018.01)
G06F 21/44 (2013.01)
G06F 9/445 (2018.01)
H04L 29/08 (2006.01)

(52) U.S. Cl.
CPC .............. *G06F 8/61* (2013.01); *G06F 21/44* (2013.01); *G06F 9/44526* (2013.01); *H04L 67/10* (2013.01)

(58) Field of Classification Search
CPC ....................................................... G06F 8/61
USPC .................................................. 717/168–178
See application file for complete search history.

(56) References Cited

U.S. PATENT DOCUMENTS

| | | | | |
|---|---|---|---|---|
| 5,974,454 A * | 10/1999 | Apfel | ........................ | G06F 8/65 709/218 |
| 6,349,408 B1 * | 2/2002 | Smith | ..................... | G06F 9/445 717/168 |
| 6,453,468 B1 * | 9/2002 | D'Souza | ................ | G06Q 30/06 717/168 |
| 6,606,744 B1 * | 8/2003 | Mikurak | ................. | H04L 29/06 717/174 |
| 7,228,541 B2 * | 6/2007 | Gupton | ..................... | G06F 8/61 717/175 |
| 2007/0256068 A1 * | 11/2007 | Barr | ......................... | G06F 8/63 717/168 |

(Continued)

OTHER PUBLICATIONS

Fujita, Kikuo, Hisato Sakaguchi, and Shinsuke Akagi. "Product variety deployment and its optimization under modular architecture and module commonalization." Proceedings of the 1999 ASME design engineering technical conferences. Las vegas, Nevada: ASME, 1999.pp. 1-12 (Year: 1999).*

(Continued)

*Primary Examiner* — Satish Rampuria

(57) ABSTRACT

Techniques to facilitate modular deployment for an application associated with an industrial automation environment are disclosed herein. In at least one implementation, module availability information is received for the application transmitted from an application module registry server. The module availability information for the application is displayed, and a selection of module data to install into the application is received, which is selected from the module availability information for the application. Responsive to the selection of the module data, the module data is retrieved from the application module registry server, and the module data is installed into the application.

20 Claims, 7 Drawing Sheets

(56) References Cited

U.S. PATENT DOCUMENTS

2008/0141240 A1* 6/2008 Uthe .................. G06F 8/61
717/174

OTHER PUBLICATIONS

Batter, Roland, et al. "Architecturing and configuring distributed application with Olan." Proceedings of the IFIP International Conference on Distributed Systems Platforms and Open Distributed Processing. Springer-Verlag, 2009.pp. 241-256 (Year: 2009).*
Guinard, Dominique, Christian Floerkemeier, and Sanjay Samna. "Cloud computing, Rest and mashups to simplify RFID application development and deployment." Proceedings of the Second International Workshop on Web of Things. ACM, 2011.pp. 1-6 (Year: 2011).*
Jones, Wendell D., et al. "Application of a usage profile in software quality models." Proceedings of the Third European Conference on Software Maintenance and Reengineering (Cat. No. PR00090). IEEE, 1999.pp. 1-10 (Year: 1999).*
Kwok, Thomas, Thao Nguyen, and Linh Lam. "A software as a service with multi-tenancy support for an electronic contract management application." 2008 IEEE International Conference on Services Computing. vol. 2. IEEE, 2008.pp. 179-186 (Year: 2008).*
Watson, F. G. R., Joel Rahman, and Shane Seaton. "Deploying environmental software using the Tarsier modelling framework." Proceedings of the Third Australian Stream Management Conference, Brisbane. vol. 2. 2001.pp. 631-637 (Year: 2001).*

* cited by examiner

APPLICATION MODULE DEPLOYMENT

TECHNICAL FIELD

Aspects of the disclosure are related to computing hardware and software technology.

TECHNICAL BACKGROUND

Software applications that run on computing systems commonly provide some type of user client interface to present information to the user and receive user inputs. In a typical client-server architecture, an application running on a client computing system receives data transmitted from a server over a communication network for display to the user on the user client interface.

Industrial automation environments utilize machines during the industrial manufacturing process. These machines typically have various moving parts and other components that continually produce operational data over time, such as pressure, temperature, speed, and other metrics. Reviewing and monitoring this operational data is of high importance to those involved in operating an industrial enterprise.

In some cases, the operational data may be provided for display on a variety of systems and devices, such as notebook or tablet computers running standalone applications, web browsers, and the like, in order to present the information to the user. For example, a tablet computer could receive a constant stream of the operational data over a network and display this information dynamically, such as by providing live tiles, icons, charts, trends, and other graphical representations which continually receive updated operational data from external data sources, which are typically located in the industrial automation environment.

OVERVIEW

Techniques to facilitate modular deployment for an application associated with an industrial automation environment are disclosed herein. In at least one implementation, module availability information is received for the application transmitted from an application module registry server. The module availability information for the application is displayed, and a selection of module data to install into the application is received, which is selected from the module availability information for the application. Responsive to the selection of the module data, the module data is retrieved from the application module registry server, and the module data is installed into the application.

This Overview is provided to introduce a selection of concepts in a simplified form that are further described below in the Detailed Description. It should be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Implementations disclosed herein provide for an extensible modular application system that enables deployment of new modules and updates to existing modules installed into an application. By modularizing various features and functions of the application, a module registry service may be utilized to manage detection and deployment of new modules to the application and new updates to those modules. In addition, a software development kit (SDK) may be employed by third parties, such as partners, end-users, customers, and other users to generate customized modules and/or updates to modules. In some implementations, the module registry service may include mechanisms to validate and verify new modules and updates, particularly those created by third parties using the SDK. The techniques disclosed herein facilitate modular deployment for an application associated with an industrial automation environment.

In at least one implementation, a computing system receives module availability information for an application transmitted from an application module registry server. The module availability information for the application is then displayed on a display system. The computing system receives a selection of module data to install into the application selected from the module availability information for the application. Responsive to the selection of the module data, the computing system retrieves the module data from the application module registry server, and the module data is installed into the application.

Figure 1:
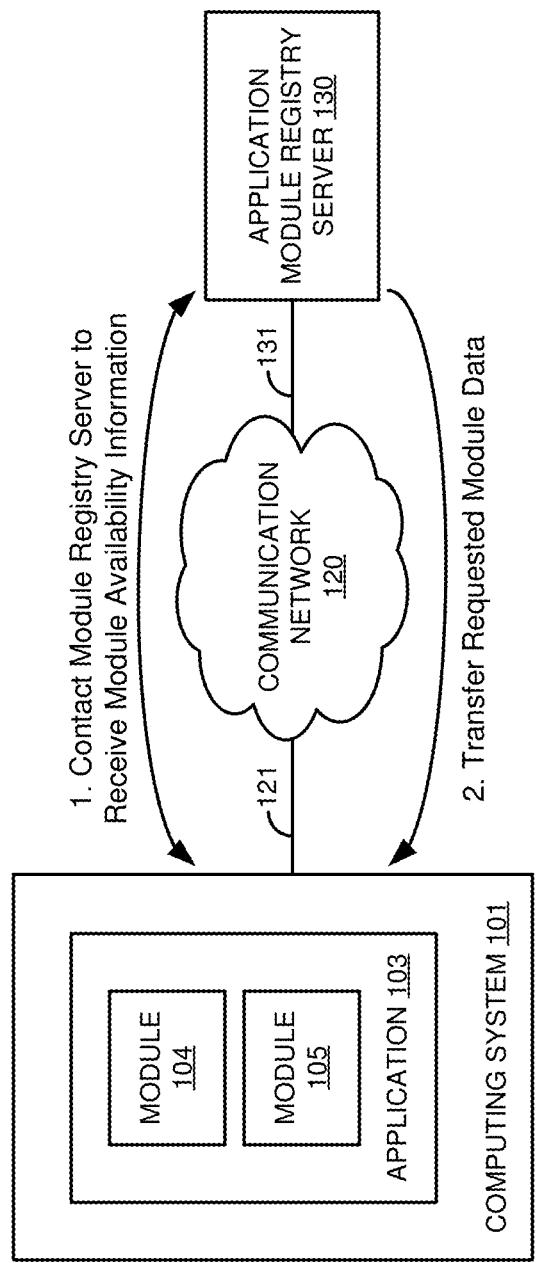
FIG. 1 is a block diagram that illustrates a communication system in an exemplary implementation.
Figure 2:
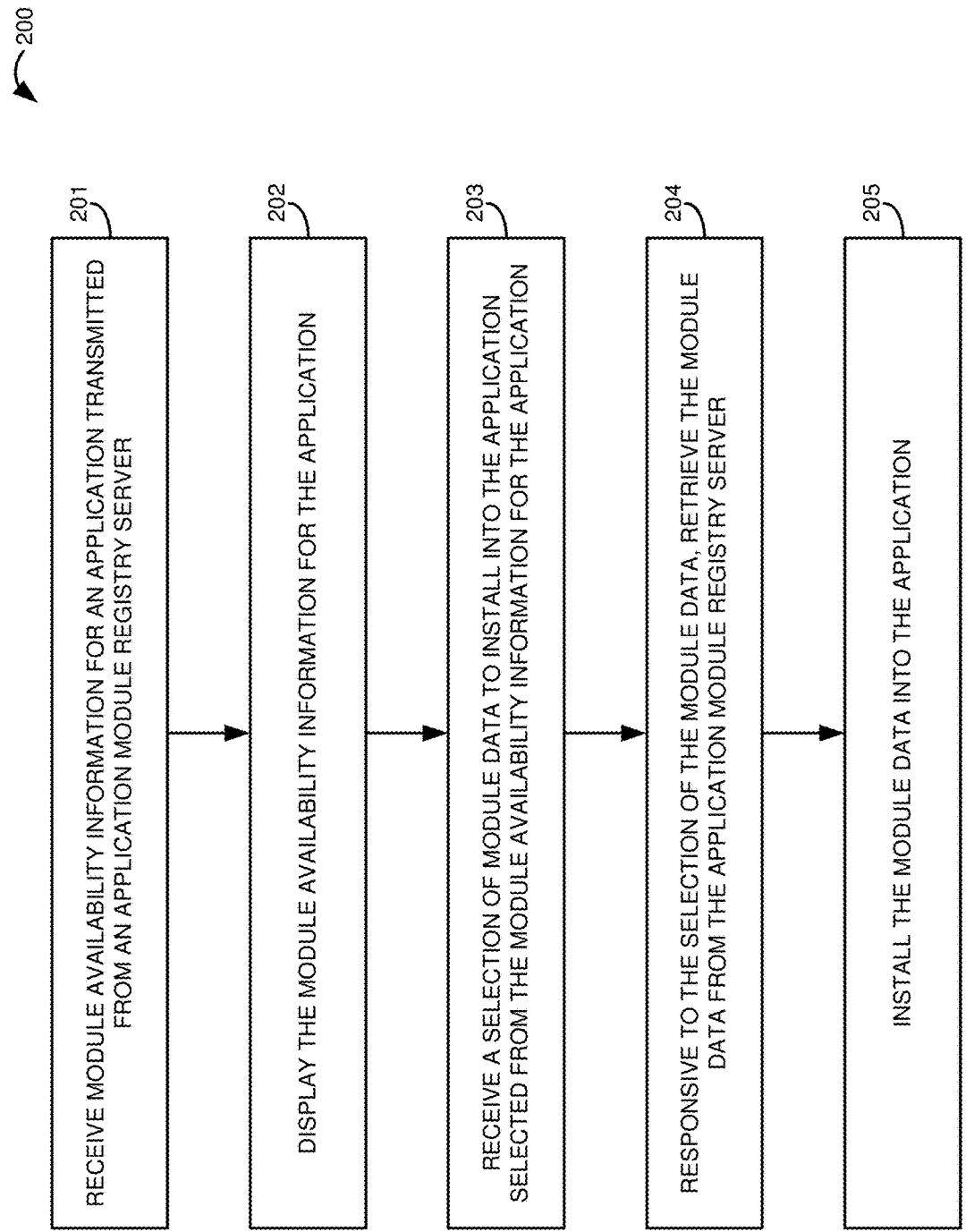
FIG. 2 is a flow diagram that illustrates an operation of a computing system in an exemplary implementation.
Figure 3:
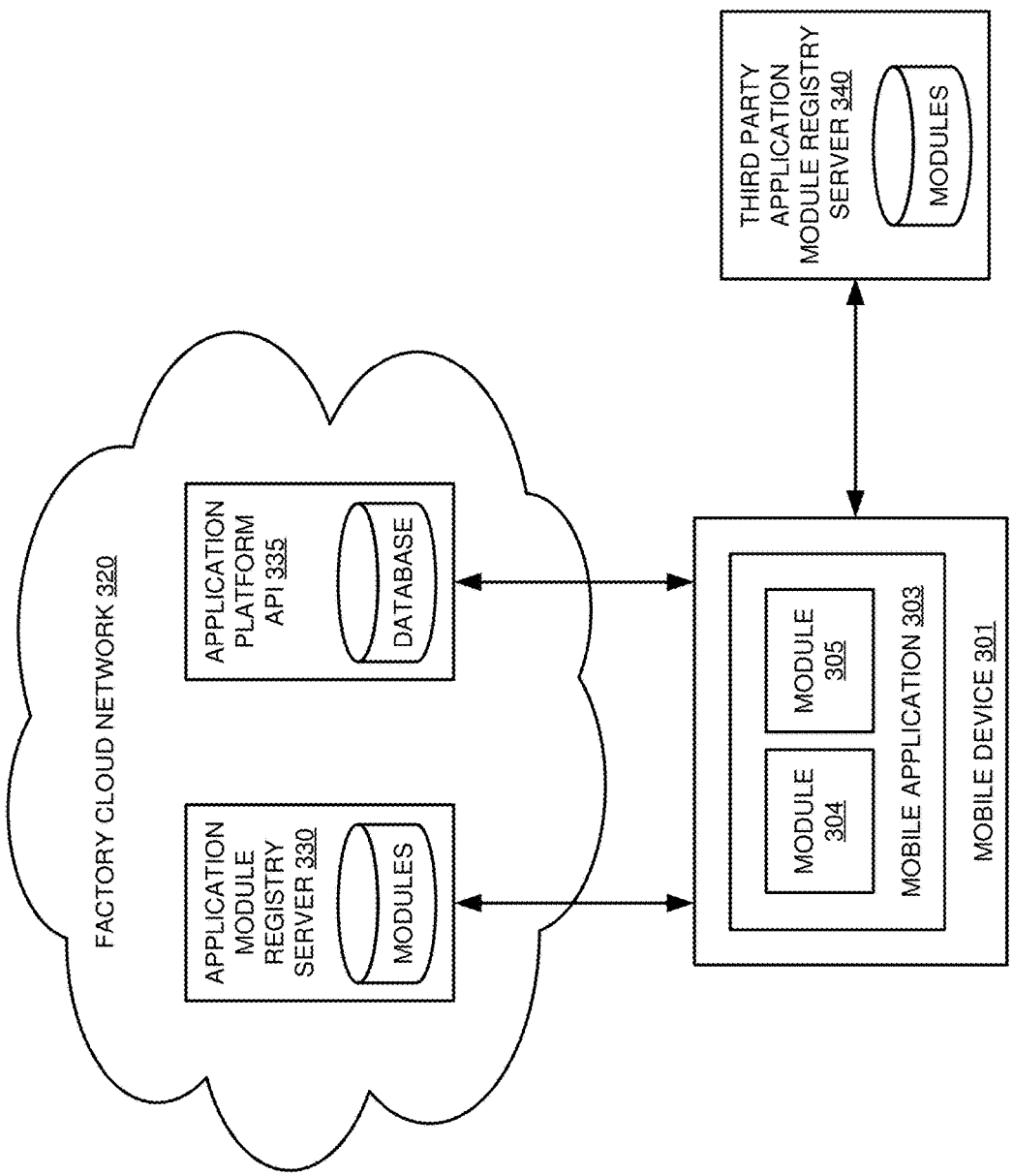
FIG. 3 is a block diagram that illustrates a communication system of an industrial automation environment in an exemplary implementation.
Figure 4:
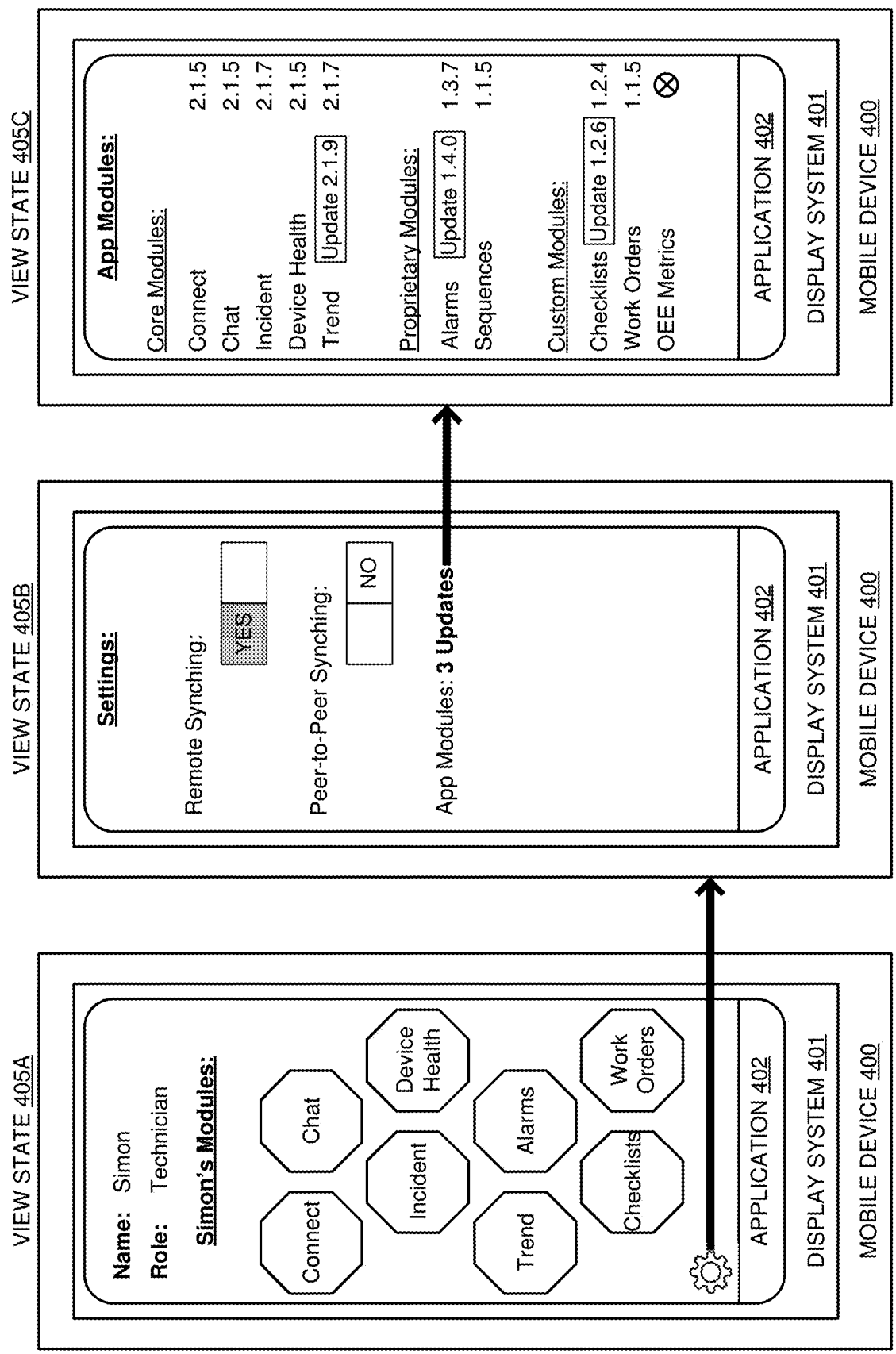
FIG. 4 is a block diagram that illustrates an operational scenario of an application displayed on a display system of a mobile device in an exemplary implementation.
Figure 5:
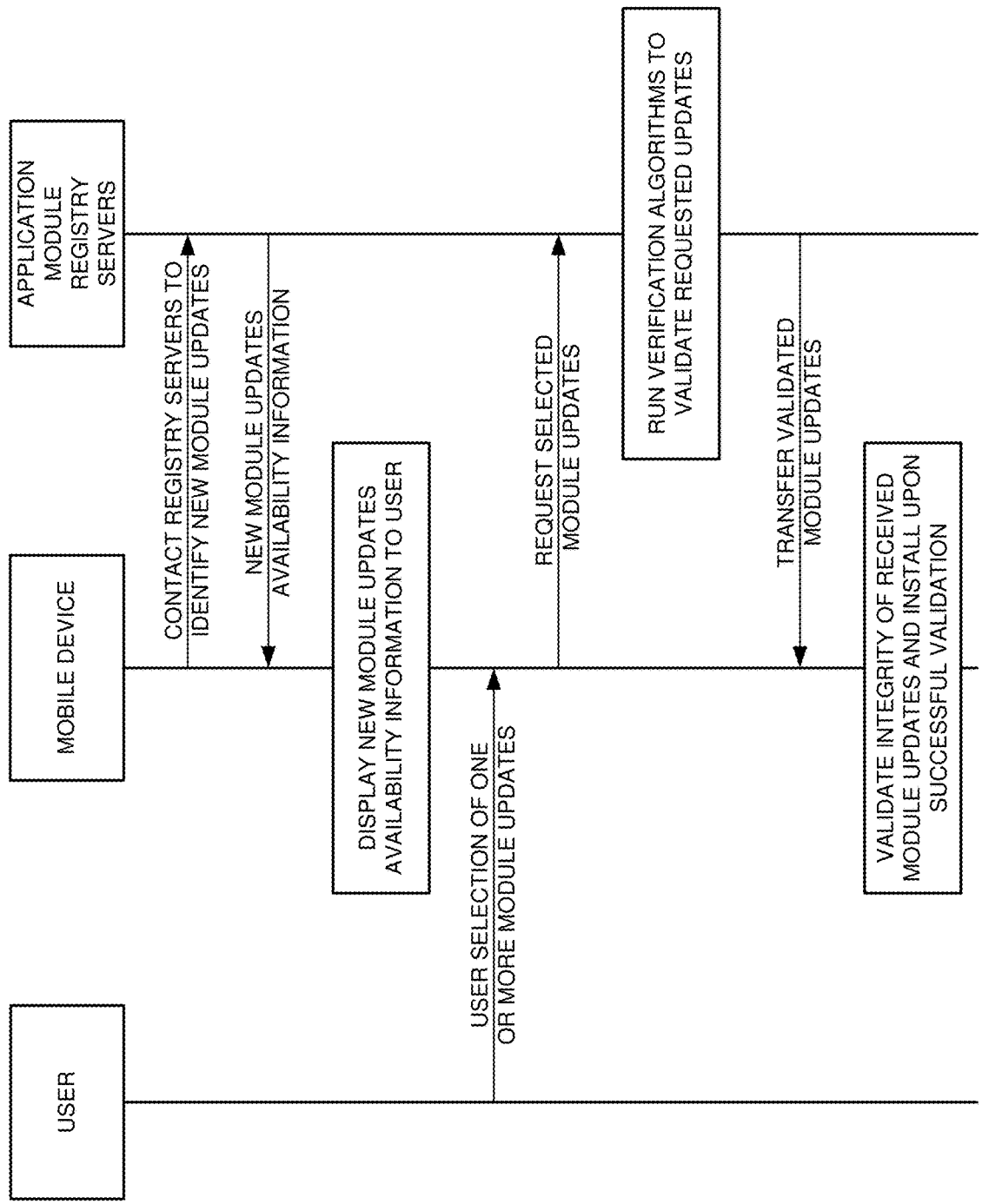
FIG. 5 is a sequence diagram that illustrates an operational scenario of a communication system in an exemplary implementation.
Figure 6:
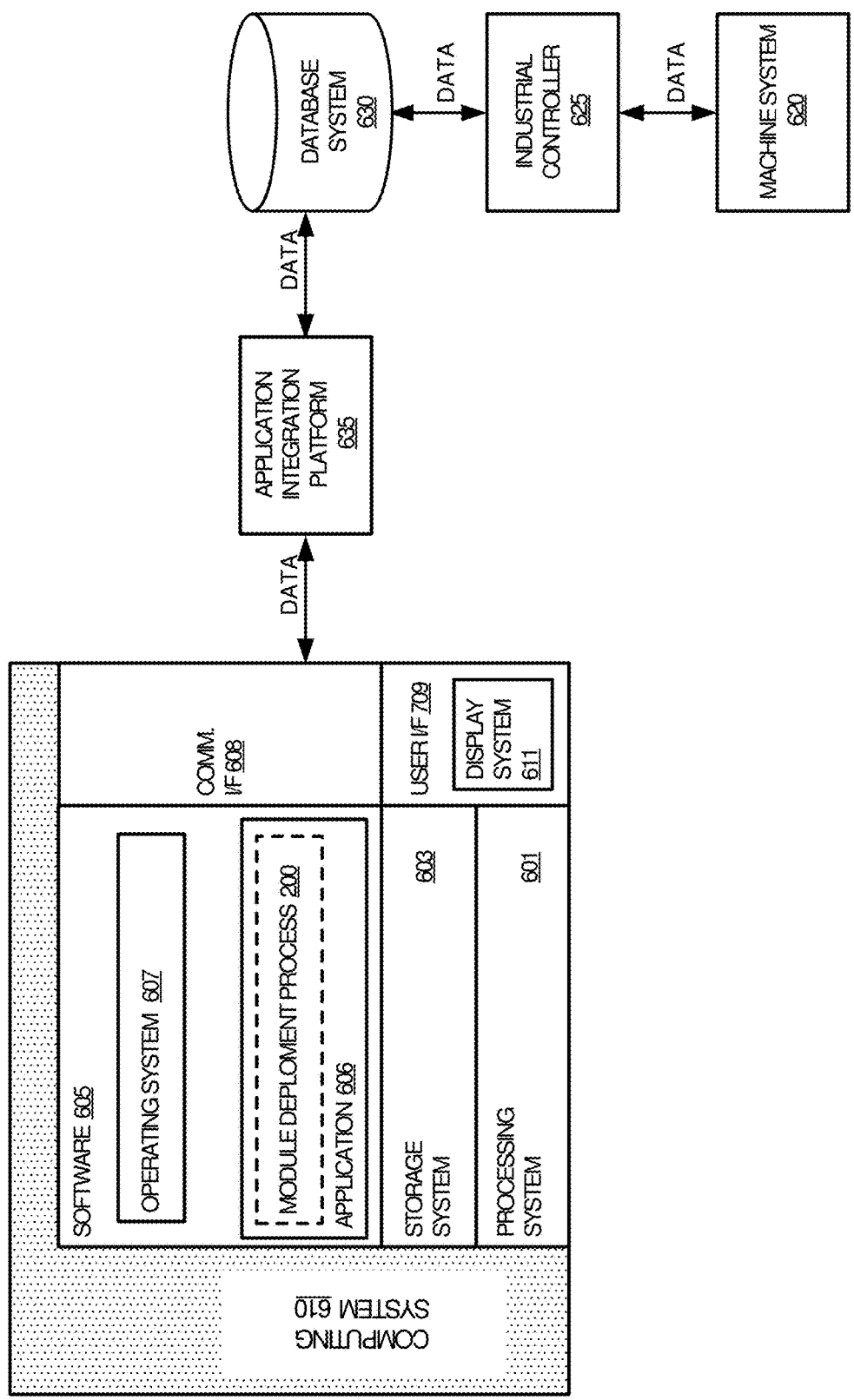
FIG. 6 is a block diagram that illustrates an operational scenario involving a computing system in an industrial automation environment in an exemplary implementation.
Figure 7:
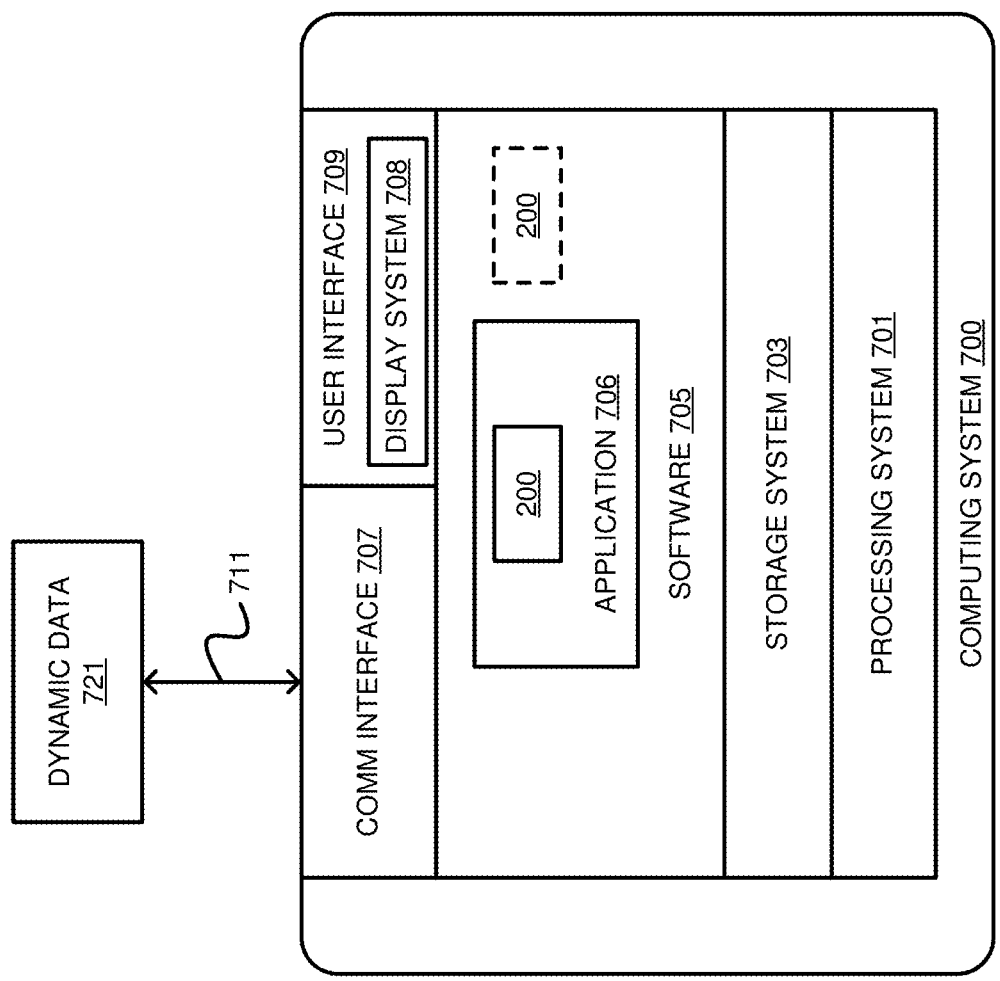
FIG. 7 is a block diagram that illustrates a computing system in an exemplary implementation.

Referring now to the drawings, FIG. 1 illustrates a communication system and an operational scenario in which an application executing on a computing system interacts with an application module registry server. FIG. 2 is a flow diagram that illustrates a module deployment process that may be performed by a computing system. FIG. 3 illustrates a cloud-based communication system of an industrial automation environment in an exemplary implementation. FIG. 4 illustrates an exemplary graphical user interface of an application executing on a mobile device from which a user may view and select updates to various modules installed on the application. FIG. 5 is a sequence diagram that illustrates an operational scenario in which a mobile device interacts with an application module registry server to update application modules in an exemplary implementation. FIG. 6 illustrates an exemplary industrial automation environment that includes a computing system that may be used to execute a module deployment process, and FIG. 7 illustrates an exemplary computing system that may be used to perform any of the module deployment processes and operational scenarios described herein.

Turning now to FIG. 1, an operational scenario of communication system 100 is illustrated in an exemplary implementation. Communication system 100 includes computing system 101, communication network 120, and application module registry server 130. Computing system 101 and communication network 120 communicate over communication link 121, while communication network 120 and application module registry server 130 are in communication over communication link 131. Computing system 101 includes application 103 having modules 104 and 105 installed therein. Some examples of modules 104 and 105 include application modules related to industrial automation, such as device status, major or minor faults, reading tags, trend data, alarm systems, and any other functions of an application used in an industrial automation environment. In at least one implementation, modules 104 and 105 could include instructions on how to connect to and communication with industrial controllers, machine systems, human-machine interface (HMI) systems, and other industrial automation equipment. For example, modules 104 and 105 could comprise information about using the common industrial protocol (CIP) to communicate with controllers, machines, and other industrial automation equipment and devices. Further, modules 104 and 105 could include data to enable run-time analytics and diagnostic information specific to controllers, machines, HMIs, and other industrial automation equipment. In some examples, modules 104 and 105 could also include security information needed for communication with these industrial devices.

An exemplary operation of communication system 100 is illustrated in FIG. 1, the order of which is designated by the numerals one and two in this example, but note that the steps could be performed in any order for any operation described herein. Initially, a user launches application 103 that was previously installed on computing system 101. Upon loading, application 103 directs computing system 101 to contact application module registry server 130 to request module availability information. In some examples, the module availability information could include information about any updates to versions of modules 104 and 105 that are already installed into application 103, and could further indicate new or different modules that are not presently installed. Upon receipt of the module availability information from application module registry server 130, application 103 presents the user with the module availability information on a display screen of computing system 101. The user can then select whether any new updates to existing modules 104 and 105 should be applied, or if any new modules should be downloaded and installed. After making these selections, application 103 transmits a request for this module data to application module registry server 103, which responsively transfers the requested module data back to application 103. Application 103 then installs the module data received from application module registry server 130 by applying updates to versions of previously installed modules 104 and 105 or installing new application modules into application 103. Another exemplary operation of computing system 101 will now be described in greater detail with respect to FIG. 2.

FIG. 2 is a flow diagram that illustrates an operation 200 of a computing system in an exemplary implementation. The operation 200 shown in FIG. 2 may also be referred to as module deployment process 200 herein. The steps of the operation are indicated below parenthetically. The following discussion of operation 200 will proceed with reference to computing system 101 and application module registry server 130 of FIG. 1 in order to illustrate its operations, but note that the details provided in FIG. 1 are merely exemplary and not intended to limit the scope of process 200 to the specific implementation shown in FIG. 1.

Operation 200 may be employed to operate a computing system to facilitate modular deployment for an application associated with an industrial automation environment. However, operation 200 could also be employed by a computing system to facilitate deploying modules for any software application irrespective of its purpose or functionality, including mobile applications for execution on a mobile device, editing and design tools, industrial control systems, analytics processors, supervisory control and data acquisition (SCADA) systems, simulation software, or any other application.

As shown in the operational flow of process 200, computing system 101 receives module availability information for application 103 transmitted from application module registry server 130 (201). The module availability information could comprise an indication of updates to existing modules 104 and 105 installed on application 103 and/or other available modules that are not installed on application 103. Computing system 101 could receive the module availability information in response to application 103 contacting application module registry server 130. Application 103 could include a list of network addresses at which to contact module registry servers, such as a uniform resource identifier (URI) of application module registry server 130. In some examples, application 103 could direct computing system 101 to communicate with application module registry server 130 and transmit an identifier of application 103 and/or computing system 101 that could be used by server 130 to determine which modules 104 and 105 are installed into application 103. For example, application module registry server 130 could maintain a list of modules 104 and 105 and their corresponding versions that are installed into application 103, and then determine if any new updated versions for these modules 104 and 105 exist on server 130, and could further identify other modules that are not yet installed into application 103. In another example, application 103 could transmit a list of installed modules 104 and 105 and their version numbers for delivery to application module registry server 130, and server 130 could then use this information to identify any existing updates for these module versions and any other modules that are not installed o application 103. Accordingly, the module availability information received from application module registry server 130 could then indicate an availability of an update to a module 104 or 105 that was previously installed into application 103 and/or indicate an availability of a module that is not installed into application 103.

Upon receipt of the module availability information, application 103 directs computing system 101 to display the module availability information for application 103 (202).

Computing system 101 could display the module availability information on a display system of computing system 101 for presentation to a user. The user could then review and select from the available updates to modules 104 and 105 that are already installed into application 103, and any other available modules and their versions that are not yet installed into application 103.

Computing system 101 receives a selection of module data to install into application 103 selected from the module availability information for application 103 (203). In some examples, the user of computing system 101 could select the module data to install into application 103 from the module availability information for application 103 displayed on computing system 101. The selection of the module data to install into application 103 indicates the particular updates to modules 104 and 105 that are selected for installation, or other available modules to install into application 103. Accordingly, the module data to install into application 103 could comprise an update to module 104 or 105, or a module that is not presently installed into application 103, including combinations thereof. In some examples, application 103 may be used among a team of users, and the selection of the module data to install into the application is received from an administrator of the team. In this manner, the administrator can control which modules may be installed and updated on the computing systems of each of the team members.

Responsive to the selection of the module data, application 103 directs computing system 101 to retrieve the module data from application module registry server 130 (204). For example, application 103 could direct computing system 101 to transmit an indication of the selected module data for delivery to application module registry server 130, and server 130 could responsively transfer the requested module data back to computing system 101 for installation into application 103. Again, the module data received from application module registry server 130 could comprise the actual update data to existing modules 104 and 105 that are already installed into application 103, and the actual module data of any other modules newly selected for installation into application 103. In some examples, application module registry server 130 performs verification algorithms to validate the module data prior to deployment. For example, to validate the module data, application module registry server 130 could run validation algorithms to check that the data conforms to application programming interfaces (APIs) of application 103. In another example, application module registry server 130 could perform vulnerability checks on the module data, which may be particularly beneficial on new updates or modules that are provided by untrusted third parties. For example, application module registry server 130 could perform the validation algorithms by running a test suite or framework on the module data to conduct automated quality assurance testing on the updates or modules. Any other validation algorithms may be performed by application module registry server 130 to validate the module data and are within the scope of this disclosure.

Upon receipt of the module data, computing system 101 installs the module data into application 103 (205). For example, if the module data includes updates or new versions of previously installed modules 104 and 105, these modules will be updated to their new versions using the module data. Any newly selected modules received in the module data will also be installed into application 103. In some examples, application 103 may direct computing system 101 to validate the module data prior to installing the module data into application 103. For example, application 103 could be configured to run a checksum or hash on the module data to ensure the data was communicated accurately and securely from application module registry server 130, which could catch any man-in-the-middle attacks during data transmission. Upon successful validation, the module data is installed into application 103. However, application 103 would direct computing system 101 to revert to a previous version when validation of the module data fails, or simply not install the new updates or modules included in the module data.

Advantageously, application 103 provides an extensible module system that enables installation of individual modules 104 and 105 into application 103. By utilizing modularization, dynamic updates to individual modules 104 and 105 installed into application 103 may be detected and deployed by application module registry server 130. In addition, any other modules that are not yet installed into application 103 may be selected by a user of computing system 101 and retrieved from application module registry server 130. In this manner, specific content may be added to application 103 on a module-by-module basis, and updates may be applied to each of these modules individually, as opposed to updating the entire application 103. An example of a communication system of an industrial automation environment that may be used to implement the techniques disclosed herein will now be discussed with respect to FIG. 3.

FIG. 3 illustrates a communication system 300 of an industrial automation environment. Communication system 300 provides an example of communication system 100, although system 100 could use alternative configurations. The following examples could be executed by computing system 101 and other elements of communication system 100, and could also be combined with operation 200 of FIG. 2 in some implementations. Communication system 300 includes mobile device 301, factory cloud network 320, and third party application module registry server 340. Mobile device 301 includes mobile application 303 having application modules 304 and 305 installed therein. In this example, mobile application 303 comprises an automation mobile application for use on a mobile device such as a smartphone, tablet, or laptop. Factory cloud network 320 includes application module registry server 330 and application platform API 335. Application module registry service 330 includes modules for mobile application 303 provided by the application developer, whereas third party application module registry server 340 includes custom modules provided by third party developers. Application platform API 335 includes databases that store data shared by a team of users of mobile application 303, among other data. In some examples, mobile application 303 could comprise a FactoryTalk® TeamONE mobile application provided by Rockwell Automation, Inc.

In operation, mobile application 303 executes modules 304 and 305 that are installed therein to perform their respective functions, which could include sending API calls over a hypertext transfer protocol secure (HTTPS) connection to application platform API 335 for storing or retrieving data in the team database. Mobile application 303 also directs mobile device 301 to communicate with application module registry server 330 via factory cloud network 320 over an HTTPS connection for deploying modules and updates to mobile application 303 as described herein. For example, mobile application 303 may direct mobile device 301 to connect with application module registry server 330 over factory cloud network 320 to communicate an indication of the versions of modules 304 and 305 that are installed into mobile application 303, and application module registry server 330 could detect whether any new updates to these versions of the modules 304 and 305 exist on server 330, or the availability of any other modules that are not presently installed into mobile application 303.

In at least one implementation, modules could be updated or new modules could be downloaded based on industrial automation devices discovered by mobile application 303 on the factory floor. For example, mobile application 303 could be provided with or detect connectivity information of factory devices, such as industrial controllers, machines, or some other industrial automation equipment, and upon detection and discovery of a particular device, the associated modules could be automatically downloaded and/or updated based on the version of the firmware and hardware discovered. Similarly, modules could be downloaded or updated based on industrial automation services and software discovered by mobile application 303 on the factory floor.

In some examples, the identification of the updates or other available modules may be visually presented by mobile application 303 on a display system of mobile device 301 for selection by a user of mobile device 301. Additionally or alternatively, the availability of updates or other modules may be visually presented in an administrative user interface associated with application module registry server 330 for selection by an administrator or team leader of a team of users that are collectively utilizing mobile application 303 on several individual devices. In this manner, the administrator can configure and control which modules may be installed into each instance of mobile application 303 for each team member and which updates may be applied for those modules by the team. The selected modules and updates may then be deployed by application module registry server 330 over factory cloud network 320 for installation into mobile application 303 installed on the devices of the individual team members. Custom modules and updates to those modules may also be controlled and selected for deployment in a similar manner from third party application module registry server 340, again over an HTTPS connection to ensure transfer security. Servers 330 and 340 may also perform verification algorithms on the updates and modules selected for deployment to validate the operation and security of the modules prior to deployment as discussed above. Mobile application 303 could also perform its own validation of the updates and modules received from servers 330 and 340 to ensure the data was transmitted accurately and securely. In this manner, modular updates to mobile application 303 may be identified, selected, verified, and deployed for installation into mobile application 303. An example of sequential view states of a graphical user interface provided by an automation mobile application that illustrates one possible implementation of the techniques disclosed herein will now be discussed with respect to FIG. 4.

FIG. 4 is a block diagram that illustrates application 402 displayed on display system 401 of mobile device 400 in an exemplary implementation. In this example, application 402 comprises an automation mobile application for use on a mobile device such as a smartphone, tablet, or laptop. Mobile device 400 provides an example of computing system 101 and mobile device 301, although system 101 and device 301 could use alternative configurations. The following example could be executed by computing system 101 and other elements of communication system 100, and could also be combined with operation 200 of FIG. 2 in some implementations. The following example could also be executed by mobile device 301 and other elements of communication system 300 in some implementations.

As shown in view state 405A, when a user first launches the automation mobile application 402, the user is presented with a home screen comprising various application modules installed into application 402 as shown on display system 401. In this case, the modules installed into application 402 include the connect, chat, incident, device health, trend, alarms, checklists, and work orders modules. Note that there may be additional modules that are installed into application 402 that are not shown in view state 405A, but may be accessed by the user by swiping right or left to view additional screens that would display these additional modules. At the lower left corner of the application display, a gear icon for changing settings is shown. In this example, the user clicks the gear icon to access the settings menu, as shown in view state 405B.

View state 405B shows various settings for application 402 displayed on display system 401 of mobile device 400. The settings in this example include remote synching, peer-to-peer synching, and application modules. The application modules setting indicates that three updates are available for the modules that are currently installed into application 402. Application 402 is aware of these three updates by communicating with application modules registry servers, such as servers 330 and 340 of communication system 300, in order to receive indications of the availability of these updates. By clicking the link indicating the three available updates, the user is presented with an application modules menu as shown in view state 405C.

View state 405C provides a list of application modules for application 402. In this example, the list of application modules is separated into groups of core modules, proprietary modules, and custom modules. The various modules in each of the groups that are installed into application 402 are shown in the list along with their version numbers. The core modules group includes a connect module version 2.1.5, chat module version 2.1.5, incident module version 2.1.7, device health module version 2.1.5, and trend module version 2.1.7. An update to the trend module is also indicated, which if selected, would enable the user to download and install the trend update from an application module registry server in order to update the trend module to version 2.1.9. Note that this option to update the trend module may not be available if an administrator or team leader has not approved the update for installation into application 402.

Referring still to view state 405C, the proprietary modules group includes an alarms module version 1.3.7 and a sequences module version 1.1.5. An update to the alarms module is indicated, which if selected, would enable the user to download and install the alarms update from an application module registry server in order to update the alarms module to version 1.4.0. Again, note that this option to update the alarms module may not be available if an administrator or team leader has not approved the update for installation into application 402. Finally, the custom modules group includes a checklists module version 1.2.4 and a work orders module version 1.1.5. The custom modules group also indicates an OEE metrics module, but this module is not presently installed into application 402, as indicated by the circled X icon instead of a version number for this module. As shown in the custom modules group, an update to the checklists module is indicated, which if selected, would enable the user to download and install the checklists update from an application module registry server in order to update the checklists module to version 1.2.6. Again, note that this option to update the checklists module may not be available if an administrator or team leader has not approved the update for installation into application 402. Likewise, the ability to install the presently-uninstalled OEE metrics module could be controlled by an administrator in a similar manner as described above. A sequence diagram that illustrates an exemplary operational scenario employing the techniques disclosed herein will now be discussed with respect to FIG. 5.

FIG. 5 is a sequence diagram that illustrates an operational scenario of a communication system in an exemplary implementation. The sequence diagram shows a user interacting with an application executing on a mobile device, and the mobile device interacting with application module registry servers to identify, select, and deploy new module updates to modules installed into the application. Initially, the user launches an application that is installed on the mobile device (not shown). When the application loads, it instructs the mobile device to contact the application module registry servers to identify new module updates for modules installed into the application. For example, the application could transmit an indication of installed modules and their versions for use by the application module registry servers to identify any newly available updates to these modules. In another example, the application could simply provide a unique identifier that identifies the application to the module registry server, and the server could keep track of which modules and their versions are installed into this instance of the application associated with the unique identifier. Regardless, application module registry servers identify any newly available module updates for the application, and transfer availability information that identifies the new module updates back to the mobile device.

Upon receipt of the new module updates availability information, the application directs the mobile device to display the availability information that identifies the new module updates for presentation to the user. The user then selects one or more of the module updates to be installed into the application, and the application then directs the mobile device to transfer a request for the selected module updates to the application module registry servers. The application module registry servers run verification algorithms on the selected module updates to validate the requested updates. Note that this verification process could occur at any time prior to the request for the selected module updates as well, such as when any new module updates are first uploaded to the registry servers. Once the selected module updates have been verified and validated, the application module registry servers transfer the validated module updates for delivery to the mobile device. The application then validates the integrity of the received module updates. For example, the application verifies that the updates were not corrupted or tampered with during transmission from the registry servers by running a checksum or similar verification process on the received updates, and could perform further testing and validation to ensure the integrity and operability of the updates. Upon successful validation, the application installs the updates to the modules into the application. In this manner, the user is afforded the ability to only update specific modules of an application, without having to update the entire application. Further, by providing an extensible module system that verification and validation of modules and updates in both the module registry servers and the mobile device, the system allows for securely applying updates from partners, third parties, and end customers, while providing a robust defense against rogue modules and updates.

Now referring back to FIG. 1, computing system 101 comprises a processing system and communication transceiver. Computing system 101 may also include other components such as a user interface, data storage system, and power supply. Computing system 101 may reside in a single device or may be distributed across multiple devices. Examples of computing system 101 include mobile computing devices, such as cell phones, tablet computers, laptop computers, notebook computers, and gaming devices, as well as any other type of mobile computing devices and any combination or variation thereof. Examples of computing system 101 also include desktop computers, server computers, and virtual machines, as well as any other type of computing system, variation, or combination thereof. In some implementations, computing system 101 could comprise a mobile device capable of operating in a server-like fashion which, among other uses, could be utilized in a wireless mesh network.

Communication network 120 could comprise multiple network elements such as routers, gateways, telecommunication switches, servers, processing systems, or other communication equipment and systems for providing communication and data services. In some examples, communication network 120 could comprise wireless communication nodes, telephony switches, Internet routers, network gateways, computer systems, communication links, or some other type of communication equipment, including combinations thereof. Communication network 120 may also comprise optical networks, packet networks, wireless mesh networks (WMN), local area networks (LAN), metropolitan area networks (MAN), wide area networks (WAN), or other network topologies, equipment, or systems, including combinations thereof. Communication network 120 may be configured to communicate over metallic, wireless, or optical links. Communication network 120 may be configured to use time-division multiplexing (TDM), Internet Protocol (IP), Ethernet, optical networking, wireless protocols, communication signaling, peer-to-peer networking over Bluetooth, Bluetooth low energy, Wi-Fi Direct, near field communication (NFC), or some other communication format, including combinations thereof. In some examples, communication network 120 includes further access nodes and associated equipment for providing communication services to several computer systems across a large geographic region.

Application module registry server 130 may be representative of any computing apparatus, system, or systems on which the techniques disclosed herein or variations thereof may be suitably implemented. Application module registry server 130 comprises a processing system and communication transceiver. Application module registry server 130 may also include other components such as a router, server, data storage system, and power supply. Application module registry server 130 may reside in a single device or may be distributed across multiple devices. Application module registry server 130 may be a discrete system or may be integrated within other systems, including other systems within communication system 100. Some examples of application module registry server 130 include desktop computers, server computers, cloud computing platforms, and virtual machines, as well as any other type of computing system, variation, or combination thereof. In some examples, application module registry server 130 could comprise a cloud-based service, network switch, router, switching system, packet gateway, authentication, authorization, and accounting (AAA) server, billing system, network gateway system, Internet access node, application server, database system, service node, firewall, or some other communication system, including combinations thereof.

Communication links 121 and 131 use metal, air, space, optical fiber such as glass or plastic, or some other material as the transport medium—including combinations thereof. Communication links 121 and 131 could use various communication protocols, such as TDM, IP, Ethernet, telephony, optical networking, hybrid fiber coax (HFC), communication signaling, wireless protocols, or some other communication format, including combinations thereof. Communication links 121 and 131 could be direct links or may include intermediate networks, systems, or devices.

Turning now to FIG. 6, a block diagram that illustrates an industrial automation environment 600 in an exemplary implementation is shown. Industrial automation environment 600 provides an example of an industrial automation environment that may be utilized to implement the module deployment processes disclosed herein, but other environments could also be used. Industrial automation environment 600 includes computing system 610, machine system 620, industrial controller 625, database system 630, and application integration platform 635. Computing system 610 provides an example of computing system 101 and mobile devices 301 and 400, although system 101 and devices 301 and 400 could use alternative configurations. Application integration platform 635 provides an example of application module registry servers 130, 330, and 340, and/or application platform API 335, although servers 130, 330, 335, and 340 could use alternative configurations. Machine system 620 and controller 625 are in communication over a communication link, controller 625 and database system 630 communicate over a communication link, database system 630 and application integration platform 635 communicate over a communication link, and application integration platform 635 and computing system 610 are in communication over a communication link. Note that there would typically be many more machine systems in most industrial automation environments, but the number of machine systems shown in FIG. 6 has been restricted for clarity.

Industrial automation environment 600 comprises an automobile manufacturing factory, food processing plant, oil drilling operation, microprocessor fabrication facility, or some other type of industrial enterprise. Machine system 620 could comprise a sensor, drive, pump, filter, drill, motor, robot, fabrication machinery, mill, printer, or any other industrial automation equipment, including their associated control systems. A control system comprises, for example, industrial controller 625, which could include automation controllers, programmable logic controllers (PLCs), programmable automation controllers (PACs), or any other controllers used in automation control. Additionally, machine system 620 could comprise other industrial equipment, such as a brew kettle in a brewery, a reserve of coal or other resources, or any other element that may reside in an industrial automation environment 600.

Machine system 620 continually produces operational data over time. The operational data indicates the current status of machine system 620, such as parameters, pressure, temperature, speed, energy usage, operational equipment effectiveness (OEE), mean time between failure (MTBF), mean time to repair (MTTR), voltage, throughput volumes, times, tank levels, or any other performance status metrics. The operational data may comprise dynamic charts or trends, real-time video, or some other graphical content. Machine system 620 and/or controller 625 is capable of transferring the operational data over a communication link to database system 630, application integration platform 635, and computing system 610, typically via a communication network. Database system 630 could comprise a disk, tape, integrated circuit, server, or some other memory device. Database system 630 may reside in a single device or may be distributed among multiple memory devices.

Application integration platform 635 comprises a processing system and a communication transceiver. Application integration platform 635 may also include other components such as a router, server, data storage system, and power supply. Application integration platform 635 may reside in a single device or may be distributed across multiple devices. Application integration platform 635 may be a discrete system or may be integrated within other systems—including other systems within industrial automation environment 600. In some examples, application integration platform 635 could comprise a FactoryTalk® VantagePoint server system provided by Rockwell Automation, Inc.

The communication links over which data is exchanged between machine system 620, industrial controller 625, database system 630, application integration platform 635, and communication interface 608 of computing system 610 could use metal, air, space, optical fiber such as glass or plastic, or some other material as the transport medium, including combinations thereof. The communication links could comprise multiple network elements such as routers, gateways, telecommunication switches, servers, processing systems, or other communication equipment and systems for providing communication and data services. These communication links could use various communication protocols, such as TDM, IP, Ethernet, telephony, optical networking, packet networks, wireless mesh networks (WMN), local area networks (LAN), metropolitan area networks (MAN), wide area networks (WAN), hybrid fiber coax (HFC), communication signaling, wireless protocols, communication signaling, peer-to-peer networking over Bluetooth, Bluetooth low energy, Wi-Fi Direct, near field communication (NFC), or some other communication format, including combinations thereof. The communication links could be direct links or may include intermediate networks, systems, or devices.

Computing system 610 may be representative of any computing apparatus, system, or systems on which the data collection processes disclosed herein or variations thereof may be suitably implemented. Computing system 610 provides an example of a computing system that could be used as a either a server or a client device in some implementations, although such devices could have alternative configurations. Examples of computing system 610 include mobile computing devices, such as cell phones, tablet computers, laptop computers, notebook computers, and gaming devices, as well as any other type of mobile computing devices and any combination or variation thereof. Examples of computing system 610 also include desktop computers, server computers, and virtual machines, as well as any other type of computing system, variation, or combination thereof. In some implementations, computing system 610 could comprise a mobile device capable of operating in a server-like fashion which, among other uses, could be utilized in a wireless mesh network.

Computing system 610 includes processing system 601, storage system 603, software 605, communication interface 608, and user interface 609. Processing system 601 is operatively coupled with storage system 603, communication interface 608, and user interface 609. Processing system 601 loads and executes software 605 from storage system 603. Software 605 includes application 606 and operating system 607. Application 606 may include module deployment process 200 in some examples, as indicated by the dashed line in FIG. 6. When executed by computing system 610 in general, and processing system 601 in particular, software 605 directs computing system 610 to operate as described herein for module deployment process 200 or variations thereof. In this example, user interface 609 includes display system 611, which itself may be part of a touch screen that also accepts user inputs via touches on its surface. Computing system 610 may optionally include additional devices, features, or functionality not discussed here for purposes of brevity.

Turning now to FIG. 7, a block diagram is shown that illustrates computing system 700 in an exemplary implementation. Computing system 700 provides an example of computing system 101, mobile devices 301 and 400, or any computing system that may be used to execute module deployment process 200 or variations thereof, although such systems could use alternative configurations. Computing system 700 includes processing system 701, storage system 703, software 705, communication interface 707, and user interface 709. User interface 709 comprises display system 708. Software 705 includes application 706 which itself includes module deployment process 200. Module deployment process 200 may optionally be implemented separately from application 706, as indicated by the dashed line in FIG. 7.

Computing system 700 may be representative of any computing apparatus, system, or systems on which application 706 and module deployment process 200 or variations thereof may be suitably implemented. Examples of computing system 700 include mobile computing devices, such as cell phones, tablet computers, laptop computers, notebook computers, and gaming devices, as well as any other type of mobile computing devices and any combination or variation thereof. Note that the features and functionality of computing system 700 may apply as well to desktop computers, server computers, and virtual machines, as well as any other type of computing system, variation, or combination thereof.

Computing system 700 includes processing system 701, storage system 703, software 705, communication interface 707, and user interface 709. Processing system 701 is operatively coupled with storage system 703, communication interface 707, and user interface 709. Processing system 701 loads and executes software 705 from storage system 703. When executed by computing system 700 in general, and processing system 701 in particular, software 705 directs computing system 700 to operate as described herein for module deployment process 200 or variations thereof. Computing system 700 may optionally include additional devices, features, or functionality not discussed herein for purposes of brevity.

Referring still to FIG. 7, processing system 701 may comprise a microprocessor and other circuitry that retrieves and executes software 705 from storage system 703. Processing system 701 may be implemented within a single processing device but may also be distributed across multiple processing devices or sub-systems that cooperate in executing program instructions. Examples of processing system 701 include general purpose central processing units, application specific processors, and logic devices, as well as any other type of processing device, combinations, or variations thereof.

Storage system 703 may comprise any computer readable media or storage media readable by processing system 701 and capable of storing software 705. Storage system 703 may include volatile and nonvolatile, removable and non-removable media implemented in any method or technology for storage of information, such as computer readable instructions, data structures, program modules, or other data. Storage system 703 may be implemented as a single storage device but may also be implemented across multiple storage devices or sub-systems co-located or distributed relative to each other. Storage system 703 may comprise additional elements, such as a controller, capable of communicating with processing system 701. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In no case is the storage media a propagated signal.

In operation, in conjunction with user interface 709, processing system 701 loads and executes portions of software 705, such as module deployment process 200, to render a graphical user interface for application 706 for display by display system 708 of user interface 709. Software 705 may be implemented in program instructions and among other functions may, when executed by computing system 700 in general or processing system 701 in particular, direct computing system 700 or processing system 701 to receive module availability information for application 706 transmitted from an application module registry server. Software 705 may further direct computing system 700 or processing system 701 to display the module availability information for application 706 on display system 708 of computing system 700. Software 705 may further direct computing system 700 or processing system 701 to receive a selection of module data to install into application 706 selected from the module availability information for application 706. In addition, software 705 directs computing system 700 or processing system 701 to, responsive to the selection of the module data, retrieve the module data from the application module registry server. Finally, software 705 may direct computing system 700 or processing system 701 to install the module data into application 706.

Software 705 may include additional processes, programs, or components, such as operating system software or other application software. Examples of operating systems include Windows®, iOS®, and Android®, as well as any other suitable operating system. Software 705 may also comprise firmware or some other form of machine-readable processing instructions executable by processing system 701.

In general, software 705 may, when loaded into processing system 701 and executed, transform computing system 700 overall from a general-purpose computing system into a special-purpose computing system customized to facilitate modular deployment for an application associated with an industrial automation environment as described herein for each implementation. For example, encoding software 705 on storage system 703 may transform the physical structure of storage system 703. The specific transformation of the physical structure may depend on various factors in different implementations of this description. Examples of such factors may include, but are not limited to the technology used to implement the storage media of storage system 703 and whether the computer-storage media are characterized as primary or secondary storage.

In some examples, if the computer-storage media are implemented as semiconductor-based memory, software 705 may transform the physical state of the semiconductor memory when the program is encoded therein. For example, software 705 may transform the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

It should be understood that computing system 700 is generally intended to represent a computing system with which software 705 is deployed and executed in order to implement application 706 and/or module deployment process 200 (and variations thereof). However, computing system 700 may also represent any computing system on which software 705 may be staged and from where software 705 may be distributed, transported, downloaded, or otherwise provided to yet another computing system for deployment and execution, or yet additional distribution. For example, computing system 700 could be configured to deploy software 705 over the internet to one or more client computing systems for execution thereon, such as in a cloud-based deployment scenario.

Communication interface 707 may include communication connections and devices that allow for communication between computing system 700 and other computing systems (not shown) or services, over a communication network 711 or collection of networks. In some implementations, communication interface 707 receives dynamic data 721 over communication network 711. Examples of connections and devices that together allow for inter-system communication may include network interface cards, antennas, power amplifiers, RF circuitry, transceivers, and other communication circuitry. The aforementioned network, connections, and devices are well known and need not be discussed at length here.

User interface 709 may include a voice input device, a touch input device for receiving a gesture from a user, a motion input device for detecting non-touch gestures and other motions by a user, and other comparable input devices and associated processing elements capable of receiving user input from a user. Output devices such as display system 708, speakers, haptic devices, and other types of output devices may also be included in user interface 709. The aforementioned user input devices are well known in the art and need not be discussed at length here. User interface 709 may also include associated user interface software executable by processing system 701 in support of the various user input and output devices discussed above. Separately or in conjunction with each other and other hardware and software elements, the user interface software and devices may provide a graphical user interface, a natural user interface, or any other kind of user interface.

The functional block diagrams, operational sequences, and flow diagrams provided in the Figures are representative of exemplary architectures, environments, and methodologies for performing novel aspects of the disclosure. While, for purposes of simplicity of explanation, methods included herein may be in the form of a functional diagram, operational sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The above description and associated drawings teach the best mode of the invention. The following claims specify the scope of the invention. Some aspects of the best mode may not fall within the scope of the invention as specified by the claims. Also, while the preceding discussion describes embodiments employed specifically in conjunction with the monitoring and analysis of industrial processes, other applications, such as the mathematical modeling or monitoring of any man-made or naturally-existing system, may benefit from use of the concepts discussed above. Further, those skilled in the art will appreciate that the features described above can be combined in various ways to form multiple variations of the invention. As a result, the invention is not limited to the specific embodiments described above, but only by the following claims and their equivalents.

What is claimed is:

1. One or more computer-readable storage media having program instructions stored thereon to facilitate modular deployment for an application associated with an industrial automation environment, wherein the program instructions, when executed by a computing system, direct the computing system to at least:
    on a mobile device, receive module availability information for the application transmitted from an application module registry server, wherein the module availability information indicates an availability of a module that is not installed into the application;
    on the mobile device, display the module availability information for the application;
    on the mobile device, receive a selection of module data to install into the application selected from the module availability information for the application, wherein the module data to install into the application comprises the module;
    responsive to the selection of the module data, retrieve the module data from the application module registry server, wherein the application module registry server performs verification by running a checksum to validate the module data prior to deployment; and
    via the mobile device, install the module data into the application.

2. The one or more computer-readable storage media of claim 1 wherein the program instructions, when executed by the computing system, further direct the computing system to at least, upon loading the application, request the module availability information.

3. The one or more computer-readable storage media of claim 1 wherein the module availability information indicates an availability of an update to a module that was previously installed into the application.

4. The one or more computer-readable storage media of claim 1 wherein the application is used among a team of users, and the selection of the module data to install into the application is received from an administrator of the team.

5. The one or more computer-readable storage media of claim 1 wherein the application module registry server performs additional verification algorithms to validate the module data prior to deployment.

6. The one or more computer-readable storage media of claim 1 wherein the program instructions direct the computing system to install the module data into the application upon validating the module data.

7. The one or more computer-readable storage media of claim 6 wherein the program instructions direct the computing system to revert to a previous version when validation of the module data fails.

8. A method to facilitate modular deployment for an application associated with an industrial automation environment, the method comprising:
- on a mobile device, receiving module availability information for the application transmitted from an application module registry server, wherein the module availability information indicates an availability of a module that is not installed into the application;
- on the mobile device, displaying the module availability information for the application;
- on the mobile device, receiving a selection of module data to install into the application selected from the module availability information for the application, wherein the module data to install into the application comprises the module;
- responsive to the selection of the module data, retrieving the module data from the application module registry server, wherein the application module registry server performs verification by running a checksum to validate the module data prior to deployment; and
- via the mobile device, installing the module data into the application.

9. The method of claim 8 further comprising, upon loading the application, requesting the module availability information.

10. The method of claim 8 wherein the module availability information indicates an availability of an update to a module that was previously installed into the application.

11. The method of claim 8 wherein the application is used among a team of users, and the selection of the module data to install into the application is received from an administrator of the team.

12. The method of claim 8 wherein the application module registry server performs additional verification algorithms to validate the module data prior to deployment.

13. The method of claim 8 wherein installing the module data into the application occurs in response to validating the module data.

14. The method of claim 13 further comprising reverting to a previous version when validation of the module data fails.

15. An apparatus to facilitate modular deployment for an application associated with an industrial automation environment, the apparatus comprising:
- one or more computer-readable storage media; and
- program instructions stored on the one or more computer-readable storage media that, when executed by a processing system, direct the processing system to at least:
  - on a mobile device, receive module availability information for the application transmitted from an application module registry server, wherein the module availability information indicates an availability of a module that is not installed into the application;
  - on the mobile device, display the module availability information for the application;
  - on the mobile device, receive a selection of module data to install into the application selected from the module availability information for the application, wherein the module data to install into the application comprises the module;
  - responsive to the selection of the module data, retrieve the module data from the application module registry server, wherein the application module registry server performs verification by running a checksum to validate the module data prior to deployment; and
  - via the mobile device, install the module data into the application.

16. The apparatus of claim 15 wherein the program instructions, when executed by the computing system, further direct the computing system to at least, upon loading the application, request the module availability information.

17. The apparatus of claim 15 wherein the module availability information indicates an availability of an update to a module that was previously installed into the application.

18. The apparatus of claim 15 wherein the application is used among a team of users, and the selection of the module data to install into the application is received from an administrator of the team.

19. The apparatus of claim 15 wherein the application module registry server performs additional verification algorithms to validate the module data prior to deployment.

20. The apparatus of claim 15 wherein the program instructions direct the processing system to install the module data into the application upon validating the module data.

* * * * *